United States Patent [19]

Koyama

[11] Patent Number: 5,926,390
[45] Date of Patent: *Jul. 20, 1999

[54] PROGRAMMED TEMPERATURE CONTROLLER

[75] Inventor: Isamu Koyama, Tokyo, Japan

[73] Assignee: Ohkura Electric Co., Ltd., Tokyo, Japan

[*] Notice: This patent is subject to a terminal disclaimer.

[21] Appl. No.: 08/828,363

[22] Filed: Mar. 28, 1997

[51] Int. Cl.[6] ..................................................... G06F 19/00
[52] U.S. Cl. .................................. 364/477.03; 236/15 R; 236/46 R; 236/78 B; 165/268
[58] Field of Search ......................... 364/477.03, 477.01, 364/477.04, 528.13; 236/46 R, 15 R, 78 B; 165/238, 268

[56] References Cited

U.S. PATENT DOCUMENTS

| | | | |
|---|---|---|---|
| 3,311,303 | 3/1967 | Noyes | 236/46 R |
| 4,347,974 | 9/1982 | Pinckaers et al. | 236/46 R |
| 4,730,101 | 3/1988 | Mahon et al. | 374/170 |
| 4,751,961 | 6/1988 | Levine et al. | 165/238 |
| 4,967,382 | 10/1990 | Hall | 364/528.13 |
| 5,743,464 | 4/1998 | Koyama | 236/46 R |

*Primary Examiner*—William Grant
*Assistant Examiner*—Sheela S. Rao
*Attorney, Agent, or Firm*—Oblon, Spivak, McClelland, Maier & Neustadt, P.C.

[57] ABSTRACT

A programmed temperature controller including a difference detector which detects a temperature difference ΔT between a quick-response temperature TC2 and a slow-response temperature TC3 at a quickly-responding portion and a slowly-responding portion of a workpiece (e.g., on the surface and core portions thereof). Also included is a comparator which compares the temperature difference ΔT against an allowable difference limit preset by a difference setter. When the temperature difference Δt is found to be outside the allowable difference limit, a slope operator is actuated by the comparator, so as to calculate a slope of temperature change with respect to time of a program pattern PP which keeps the temperature difference Δt within the allowable limit. The above-mentioned slope in the program pattern PP is modified to the calculated value, and the temperature difference ΔT is maintained within the allowable difference limit.

8 Claims, 2 Drawing Sheets

PROGRAMMED TEMPERATURE CONTROLLER

TECHNICAL FIELD

This invention relates to a programmed temperature controller of a furnace for treating a piece of work (hereinafter referred to as a "workpiece") through a temperature rise and descent. More specifically, the invention relates to a programmed temperature controller, which is capable of automatically modifying the entire temperature distribution of a workpiece being heat treated, inclusive of the inside thereof, during the temperature rise and descent along a program pattern, so as to keep such distribution always within allowable limit.

BACKGROUND ART

Conventionally, a programmed temperature controller has compared the measured temperature value of a control thermometer (in general, measuring an atmospheric temperature) against a set value of a program pattern for effecting calculation of a two-position or PID or the like control, and for controlling the heat quantity from a heat source through regulating means such as thyristors, burners, and the like.

More particularly, with a programmed temperature controller having a controlled temperature input from a thermocouple or the like and a control or manipulating of an output after PID operation, it has been a practice to produce a certain program pattern a combination of a slope of a temperature change with time (hereinafter referred to as "slope") and keeping of a constant temperature for a period of time (hereinafter referred to as "keep time") and to proceed with a temperature control in accordance with the program pattern.

The temperature of the workpiece being heat treated, inclusive of an inside temperature thereof, however, does not always follow the controlled temperature, because the workpiece has a finite value of thermal capacity. Referring to FIG. 2, when the workpiece is in an atmosphere of controlled temperature TC1, there is produced in the workpiece quickly-responding portions at quick-response temperature TC2 and slowly-responding portions at a slow-response temperature TC3. The difference between the quick-response temperature TC2 and the slow-response temperature TC3 seriously affects the quality of the treated workpiece. Hence, conventional programmed temperature controllers use, apart from the controlled temperature input, a plurality of additional temperature information relating to the workpiece being heat treated. The additional temperature information is, for instance, indicated and recorded by a suitable recorder and temperature distribution in the entirety of the workpiece inclusive of the inside thereof is shown, and the slope of the program pattern is adjusted manually by an operator so as to keep the temperature distribution of the workpiece within an allowable range.

Thus, when heat treatment of a workpiece is effected through a temperature rise or descent by a conventional programmed controller (with a constant slope), it is not possible to ensure that the temperature distribution of the entirety of the workpiece inclusive of the inside thereof is always within a certain allowable range regardless of the weight, shape, disposition and way of overlaying the works one on another.

Further, with a conventional programmed temperature controller with a controlled temperature input and a control output after PID operation, temperature distribution in the workpiece being heat treated is not considered. Hence, monitoring of a temperature distribution in the workpiece is manually effected by a human operator through the use of a recorder or the like. Without a human operator, it has been impossible to ensure that a temperature distribution is always within an allowable range. When such control of the work temperature distribution is necessary, it has been inevitable that the conventional programmed temperature controller becomes a mere semi-automatic controller.

SUMMARY OF THE INVENTION

Thus, an object of the present invention is to solve the above situation and problems inherent to the prior art, by providing a novel programmed temperature controller cable of ensuring that the temperature distribution of a workpiece being treated through a temperature rise or descent is always within a allowable range.

To fulfill the above object, a programmed temperature controller according to the invention is made so as to be able to modify automatically the temperature distribution in a workpiece being heat treated. The programmed temperature controller of the invention has conventional elements; namely, a program setter for setting a program pattern of temperature varying with time, a first thermometer which measures a controlled temperature, e.g., furnace inside temperature, a first comparator determining a difference between the controlled temperature and the temperature set by the program setter, and a control calculator responsive to the output from the first comparator so as to produce an output signal which regulates heat input to the furnace for minimizing the difference as determined by the first comparator.

Further, the programmed temperature controller of the invention has a second thermometer mounted at a quickly-responding portion of the workpiece carried by the furnace therein for measuring a quick-response temperature thereat, a third input thermometer mounted at a slowly-responding portion of said workpiece for measuring a slow-response temperature thereat, a difference detector determining a temperature difference between the above quick-response and slow-response temperatures, a difference setter for setting an allowable difference limit of the above temperature difference, a second comparator comparing the temperature difference determined by the difference detector against the allowable difference limit, and a slope operator responsive to an output of the second comparator for calculating and producing a slope-modifying signal for modifying the slope of the program pattern which signal is applied to the program setter.

In short, the invention is to add two work temperatures to the input information of a conventional programmed temperature controller; namely, a quick-response temperature from a quickly-responding portion of the workpiece and a slow-response temperature from slowly-responding portion of the workpiece. The controller of the invention calculates and modifies the slope of the program pattern so as to keep the difference between the two work temperatures within the allowable difference limit.

With the invention, temperatures at three or more portions of the workpiece being heat treated may be connected to the controller. In this case, the difference detector in the controller may automatically calculate the difference between quickest-response temperature and the slowest-response temperature among the temperatures applied thereto.

Preferably, in the controller of the invention, the change-rate of the quick-response or slow-response temperature is determined by a rate detector, and a rate setter sets an allowable rate limit. In this case, a third comparator is provided in the controller to compare the change-rate as determined by the rate detector against the allowable rate limit, and the slope operator may modify the slope of the program pattern in response to one or both of outputs from the second comparator and the third comparator, so as to keep one or both of the temperature difference as determined by the difference detector and the change-rate as determined by the rate detector temperatures within the allowable difference limit and the allowable rate limit, respectively.

BRIEF DESCRIPTION OF DRAWINGS

For a better understanding of the invention, reference is made to the accompanying drawings, in which.

DESCRIPTION OF THE PREFERRED EMBODIMENTS

Figure 1:
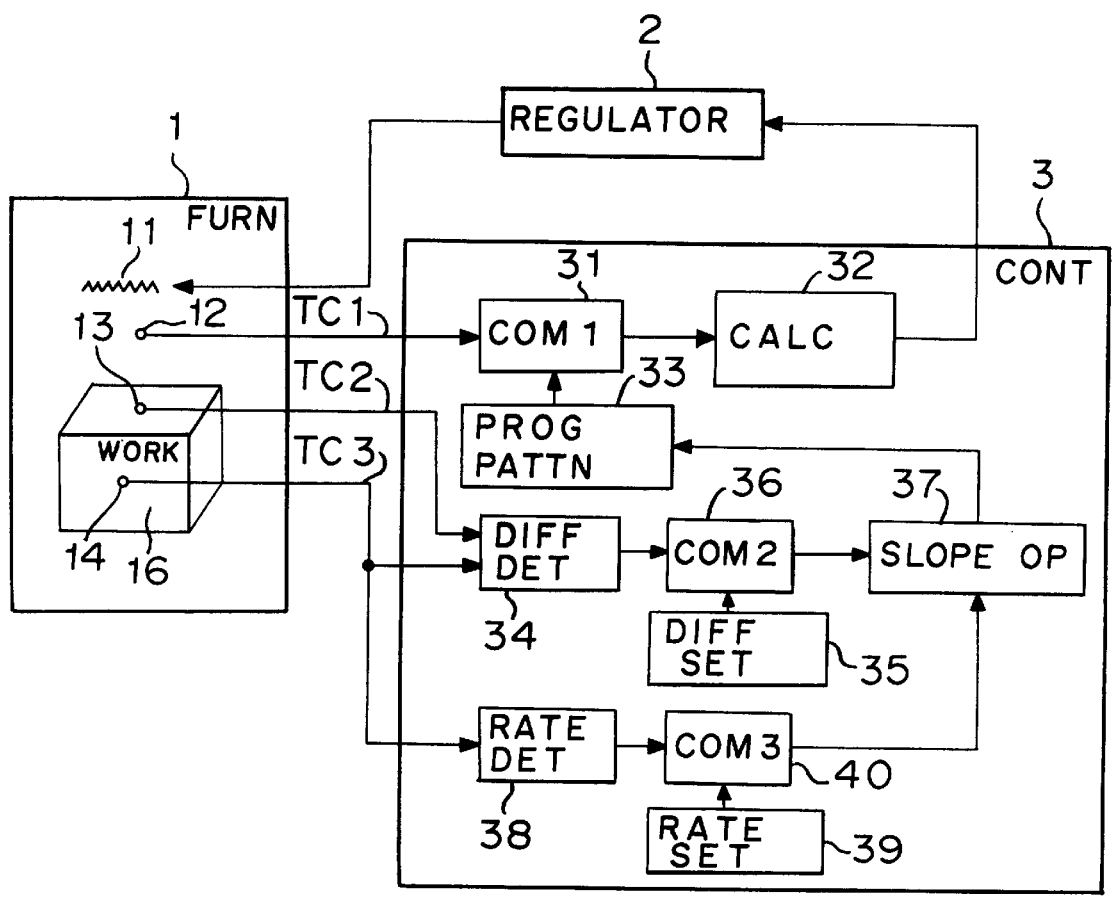
FIG. 1 is a block diagram showing various elements constituting a programmed temperature controller according to the invention.
Figure 2:
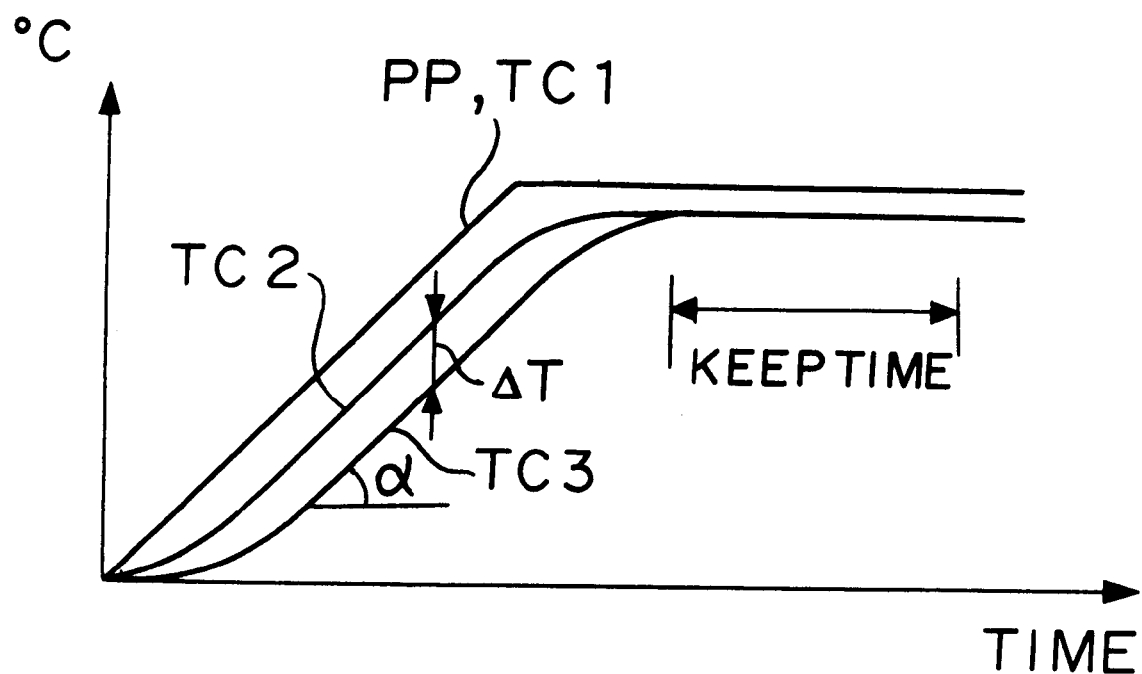
FIG. 2 is a graph showing an example of program pattern and temperature variations at different portions of a work being heat treated.

Referring to FIGS. 1 and 2, in case of a conventional controller 3, only one input information, i.e., controlled temperature TC1 is applied from a furnace inside thermometer 12 disposed in a furnace 1. Thus, the inside temperature of the furnace 1 is controlled, but the temperature distribution on and within the workpiece 16 being heat treated has not been the subject matter of the control.

In order to keep the temperature distribution on and at the inside of the work 16 within an allowable range, the invention applies quick-response temperature TC2 and slow-response temperature TC3 of the workpiece 16 to the controller 3. The quick-response temperature TC2 is from a quickly-responding portion, e.g., surface, of the workpiece 16, while the slow-response temperature TC3 is from a slowly-responding portion, e.g., core part, of the workpiece 16.

Referring to FIGS. 1 and 2, the furnace 1 carries a workpiece 16 therein and a heater 11 heats the inside atmosphere of the furnace 1. The temperature of the furnace inside atmosphere represents a controlled temperature TC1 and is measured by a furnace inside thermometer 12. In this embodiment, the quick-response temperature TC2 is measured at the surface of the workpiece 16 by a workpiece surface thermometer 13, while the slow-response temperature TC3 is measured at the core of the workpiece 16 by a workpiece core thermometer 14. The thermal output from the heater 11 may be controlled by a power regulator 2 made of thyristors, SCR or the like.

The controller 3 has a first input port for receiving the controlled temperature TC1 from a furnace inside thermometer 12, a program pattern setter 33 setting values of a program pattern PP, a first comparator 31 comparing the controlled temperature TC1 against the set value of the program pattern PP, and a control calculator 32 responsive to the output from the first comparator 31 for producing control or manipulating output after applying a computational operation such as PID operation on the comparison output of the first comparator 31. In FIG. 2, the controlled temperature TC1 is assumed to be in coincidence with the control pattern PP.

The embodiment of controller 3 in FIG. 1 further comprises a second input port receiving quick-response temperature TC2 from a workpiece surface thermometer 13, a third input port for receiving slow-response temperature TC3 from a workpiece core thermometer 14, a difference detector 34 detecting temperature-difference $\Delta T$ (see FIG. 2) between the quick-response temperature TC2 and the slow-response temperature TC3, a difference setter 35 setting an allowable difference limit, a second comparator 36 comparing the temperature-difference determined by the difference detector 34 against the allowable difference limit, and a slope operator 37 responsive to the output from the second comparator 36 for modifying the slope in the program pattern PP. Furthermore, this embodiment of the controller 3 includes a rate detector 38 determining the change-rate $\alpha$ (see FIG. 2) of the slow-response temperature TC3, a rate setter 39 setting an allowable rate limit, and a third comparator 40 comparing the change-rate determined by the rate detector 39 against the allowable rate limit. The slope operator 37 is also responsive to the output from the third comparator 40 in modifying the slope of the program pattern PP.

The difference setter 35 sets an allowable difference limit in terms of a maximum allowable temperature-difference between the quick-response temperature TC2 and the slow-response temperature TC3, or between the surface temperature and core temperature of the workpiece 16 in the case of FIG. 1. In that case, the rate setter 39 sets an allowable rate limit in terms of a maximum allowable change-rate of the slow-response temperature TC3, or the core temperature of the workpiece 16. The rate setter 39 can also set an allowable rate limit in terms of a maximum allowable change-rate for the quick-response temperature TC2, if so desired.

The slope operator 37 modifies the slope of the program pattern PP in such a manner that one or both of the temperature-difference $\Delta T$ and the temperature change-rate $\alpha$ in the workpiece 16 being heat treated within allowable limits. Thereby, the slope in the program pattern PP at the pattern setter 33 is continuously modified so as to ensure that the temperature-difference among and/or change-rate of one or more of the temperatures at different portions of the workpiece 16 are in allowable limits.

In actual operation, if only the difference setter 35 for the temperature-difference is set, the temperature difference between the quick-response temperature TC2 at the workpiece surface and the slow-response temperature TC3 at the workpiece core is at first determined by the difference detector 34. Then, the second comparator 36 compares the temperature-difference thus determined against the reference (or allowable) difference set by the difference setter 35. The compared output from the second comparator 36 acts to control the slope operator 37. The slope operator 37 calculates a slope of the program pattern PP for the pattern setter 33, and determines or modifies the slope in the program pattern PP so that the temperature-difference is always kept within the allowable limit, namely the allowable difference limit set by the difference setter 35.

When both the allowable difference limit and the allowable rate limit during temperature rise or descent are specified, the third comparator 40 compares the temperature change-rate as determined by the rate detector 38 against the allowable rate limit which is preset by the rate setter 39. The outputs from both of the third comparator 40 and the above-mentioned second comparator 36 may be applied to the slope operator 37, wherein calculation of the slope is effected so as to determine such a slope of the program pattern PP which keeps both the temperature difference $\Delta t$ and the temperature change-rate $\alpha$ within the corresponding allowable limits, respectively.

Furthermore, when only the allowable rate limit during a temperature rise or descent is specified, the third comparator 40 compares the temperature change-rate as determined by the rate detector 38 against the allowable rate limit which is preset by the rate setter 39. The outputs from the third comparator 40 are applied to the slope operator 37, wherein calculation of the slope is effected so as to determine such a slope of the program pattern PP which keeps the temperature change-rate α within the allowable rate limit.

In the foregoing description, temperature distribution in the workpiece 16 is represented by two temperatures TC2 and TC3 at two portions thereof. It is also possible to measure the temperature at three or more portions of the workpiece 16 and to apply three or more temperatures from such portions to the controller 3. In this case, the difference detector 34 of the controller 3 may find the temperature difference Δt between the highest and the lowest of the temperatures at the three or more portions, and such temperature difference Δt between the highest and the lowest may be used for keeping the temperature distribution within the allowable difference limit.

As another embodiment of the invention, the controlled temperature TC1 of the furnace 1 and the slow-response temperature TC3 of the workpiece 16 may be applied to the difference detector 34, so as to use the difference between TC1 and TC3 as the temperature difference Δt at the second comparator 36.

As a modification of the embodiment of FIG. 1, different kinds of thermometers 12 and 13 may be used for measuring the temperatures TC2 and TC3 at the work surface and the work core, respectively. Such thermometers may be equipped with radio transmitters, so that the controller 3 may receive information of the temperatures TC2 and TC3 through a radio wave.

As described in detail in the foregoing, with the programmed temperature controller of the invention, the entirety of a workpiece can be heated with uniform temperature distribution, and reliable control with a specified slope of temperature change with time is ensured. Thus, special effects of improving the quality of heat treatment is achieved.

With a conventional method, constant attention of a human operator has been necessary throughout a heat treatment operation to check whether the temperature distribution and temperature change-rate (slope) of a workpiece being heated are within allowable limits or not. To be on safe side, the slope in program pattern has been set at a low level, or monitored by an operator from time to time for manual modification. According to the invention, the slope is automatically controlled, and savings in manpower and improvement in throughput is made possible.

What is claimed as new and is desired to be secured by Letters Patent of the United States is:

1. A programmed temperature controller for a furnace carrying at least one workpiece therein for thermal treatment by heating, comprising:

a program setter for setting a program pattern of a temperature change with respect to time;

a first thermometer measuring a controlled temperature of the furnace;

a first comparator comparing the controlled temperature against a set temperature of the program pattern at a particular moment;

a control calculator calculating an output signal based on an output from said first comparator, said output signal manipulating a heater of the furnace so as to minimize a difference between said controlled temperature and said set temperature of said program pattern at said particular moment;

a second thermometer mounted at a quickly-responding portion of the workpiece for measuring a quick-response temperature thereat;

a third thermometer mounted at a slowly-responding portion of the workpiece for measuring a slow-response temperature thereat;

a difference detector determining a temperature difference between said quick-response and slow-response temperatures;

a difference setter setting an allowable difference limit;

a second comparator comparing the temperature difference determined by the difference detector against said allowable difference limit; and a slope operator modifying a slope of said temperature change of said program pattern in response to an output from said second comparator so as to keep said temperature difference determined by the difference detector within said allowable difference limit.

2. A controller as set forth in claim 1, further comprising:

a rate detector determining a change-rate of one of said quick-response temperature and said slow-response temperature;

a rate setter for setting an allowable rate limit; and a third comparator comparing the change-rate determined by the rate detector against said allowable rate limit set by the rate setter, wherein said slope operator modifies said slope of said temperature change of said program pattern in response to at least one of said output from said first comparator and said output from said second comparator, so as to keep at least one of said temperature difference as determined by the difference detector and said change-rate as determined by said rate detector within said allowable difference limit and said allowable rate limit, respectively.

3. A controller as set forth in claim 2, wherein said quick-response temperature is measured at a surface portion of the workpiece and said slow-response temperature is measured at a core portion of the workpiece.

4. A controller as set forth in claim 2, wherein three or more temperatures at different portions of the work are applied to the controller, and said difference detector selects a quickest-response temperature and a slowest-response temperature among said three or more temperatures so as to determine a temperature difference between said selected quickest-response and slowest-response temperatures.

5. A controller as set forth in claim 1, wherein said quick-response temperature is measured at a surface portion of the workpiece and said slow-response temperature is measured at a core portion of the workpiece.

6. A controller as set forth in claim 1, wherein three or more temperatures at different portions of the work are applied to the controller, and said difference detector selects a quickest-response temperature and a slowest-response temperature among said three or more temperatures so as to determine a temperature difference between said selected quickest-response and slowest-response temperatures.

7. A programmed temperature controller for a furnace carrying at least one workpiece therein for thermal treatment by heating, comprising:

a program setter for setting a program pattern of a temperature change with respect to time;

a first thermometer measuring a controlled temperature of the furnace;

a first comparator comparing the controlled temperature against a set temperature of the program pattern at a particular moment;

a control calculator calculating an output signal based on an output from said first comparator, said output signal manipulating a heater of the furnace so as to minimize a difference between said controlled temperature and said set temperature of said program pattern at said particular moment;

a second thermometer mounted at a quickly-responding portion of the workpiece for measuring a quick-response temperature thereat;

a third thermometer mounted at a slowly-responding portion of the workpiece for measuring a slow-response temperature thereat;

a difference detector for determining a temperature difference between said controlled temperature and said slow-response temperature;

a difference setter setting an allowable difference limit;

a second comparator comparing the temperature difference determined by the difference detector against said allowable difference limit; and a slope operator modifying a slope of said temperature change of said program pattern in response to an output from said second comparator so as to keep said temperature difference determined by the difference detector within said allowable difference limit.

8. A programmed temperature controller for a furnace carrying at least one workpiece therein for thermal treatment by heating, comprising:

a program setter for setting a program pattern of a temperature change with respect to time;

a first thermometer measuring a controlled temperature of the furnace;

a first comparator comparing the controlled temperature against a set temperature of the program pattern at a particular moment;

a control calculator calculating an output signal based on an output from said first comparator, said output signal manipulating a heater of the furnace so as to minimize a difference between said controlled temperature and said set temperature of said program pattern at said particular moment;

a second thermometer mounted at a quickly-responding portion of the workpiece for measuring a quick-response temperature thereat;

a third thermometer mounted at a slowly-responding portion of the workpiece for measuring a slow-response temperature thereat;

a difference detector determining a temperature difference between said controlled temperature and said slow-response temperature;

a difference setter setting an allowable difference limit;

a second comparator comparing the temperature difference determined by the difference detector against said allowable difference limit;

a slope operator modifying a slope of said temperature change of said program pattern in response to an output from said second comparator so as to keep said temperature difference determined by the difference detector within said allowable difference limit; and a rate detector determining a change-rate of one of said quick-response temperature and said slow-response temperature;

a rate setter for setting an allowable rate limit; and a third comparator comparing the change-rate determined by the rate detector against said allowable rate limit set by the rate setter, wherein said slope operator modifies said slope of said temperature change of said program pattern in response to at least one of said output from said first comparator and said output from said second comparator, so as to keep at least one of said temperature difference as determined by the difference detector and said change-rate as determined by said rate detector within said allowable difference limit and said allowable rate limit, respectively.

* * * * *